United States Patent
Kuchta et al.

[11] Patent Number: 5,860,750
[45] Date of Patent: Jan. 19, 1999

[54] ASSEMBLY INCLUDING PRELOADED BEARINGS

[75] Inventors: Richard Kuchta, Vernon; Joseph Vivirito, South Windsor; Peter Hasiuk, Enfield, all of Conn.

[73] Assignee: Gerber Technology, Inc., Tolland, Conn.

[21] Appl. No.: 928,186

[22] Filed: Sep. 12, 1997

[51] Int. Cl.$^6$ .............. F16C 43/00; F16B 35/00
[52] U.S. Cl. ............ 384/540; 411/392; 384/517; 384/563; 384/585
[58] Field of Search .................. 384/504, 510, 384/517, 537, 540, 584, 585, 563; 411/392, 395, 379, 380, 381, 382

[56] References Cited

U.S. PATENT DOCUMENTS

| | | | |
|---|---|---|---|
| 1,978,567 | 10/1934 | Crafts | 384/551 |
| 2,542,377 | 2/1951 | Turkish | 411/392 |
| 2,650,867 | 9/1953 | Speith | 384/540 |
| 2,836,473 | 5/1958 | Tydeman | 384/563 |
| 2,943,894 | 7/1960 | Brook | 384/564 |
| 3,395,956 | 8/1968 | Fisher | 384/559 |
| 4,085,984 | 4/1978 | Cameron | 384/563 |
| 4,172,621 | 10/1979 | Yoshida | 384/563 |
| 4,420,281 | 12/1983 | Dehoff | 411/392 |
| 4,613,240 | 9/1986 | Hagelthorn | 384/585 |
| 4,883,368 | 11/1989 | Stein | 384/504 X |
| 4,893,948 | 1/1990 | Hoch | 384/551 |
| 4,958,941 | 9/1990 | Imanari | 384/474 |
| 5,328,275 | 7/1994 | Winn et al. | 384/472 |

*Primary Examiner*—Thomas R. Hannon
*Attorney, Agent, or Firm*—McCormick, Paulding & Huber

[57] ABSTRACT

In an assembly including preloaded bearings, a sleeve is provided and has an exterior surface and an externally threaded section adjacent to an end of the sleeve. At least two bearings, each having an inner bearing race, an outer bearing race, and a plurality of rolling elements positioned between the inner and outer bearing races, are slidably mounted on the exterior surface of the sleeve. The sleeve further includes a bore extending part-way into the sleeve adjacent to the externally threaded section, the bore defining inner interior surface. A bearing retainer is also provided and includes an internally threaded section engaged with the external threads of the sleeve for urging the inner bearing race of one of the bearings toward the inner bearing race of the other bearing, thereby preloading the bearings. The exterior surface of the sleeve and the interior surface of the bore cooperate to define a cylindrical sleeve thickness that allows the sleeve to stretch as the bearing retainer is tightened against the inner race of one of the bearings, thereby urging the external threads of the sleeve against the internal threads of the retainer, preventing the retainer from loosening as the machine in which the assembly is installed, is operated.

8 Claims, 1 Drawing Sheet

ASSEMBLY INCLUDING PRELOADED BEARINGS

FIELD OF THE INVENTION

The present invention relates generally to bearing assemblies, and deals more particularly with an assembly for preloading at least two bearings mounted on an externally threaded hollow sleeve. An internally threaded bearing retainer is engaged with the external threads of the sleeve for urging an inner race of one bearing toward an inner race of another bearing, and concomitantly stretching the sleeve so that the external threads on the sleeve are urged against the internal threads on the retainer.

BACKGROUND OF THE INVENTION

Rolling element bearings are typically manufactured with a certain amount of initial radial clearance between the rolling elements and the inner and outer bearing races. When these types of bearings are incorporated into machines requiring high system rigidity, accuracy, and repeatability, such as machine tools or cutting heads for cloth cutting machines, it may become necessary to minimize or eliminate the radial play in the bearings. This is usually accomplished by shifting the inner and outer bearing races relative to each other, a technique referred to by those skilled in the art as preloading the bearings.

One means of preloading two rolling element bearings, is to purchase the bearings as a matched set from the manufacturer. A matched set of bearings has a predetermined preload attainable by mounting the bearings adjacent to one another on a shaft and pushing the inner and/or outer bearing races together, thereby establishing the preload. The inner bearing races are generally pushed together using a standard bearing locknut and lockwasher mounted on an externally threaded section of the shaft. The bearing lockwasher includes a plurality of external tabs and an internal tab that slides in a keyway machined in the shaft. With the lockwasher engaging the inner race of one of the bearings, and the internal tab positioned in the keyway, the bearing locknut is threaded onto the shaft and tightened against the bearing lockwasher until the inner races of both bearings touch, thereby preloading the bearings. The locknut is then further tightened against the bearing until one of the external tabs in the lockwasher aligns with a slot in the locknut. The external tab on the lockwasher is then bent into the slot in the locknut and the combination of the internal tab being positioned in the keyway on the shaft and the external tab being retained in the slot on the locknut prevents the locknut from loosening during operation of the machine in which the bearings are installed.

A difficulty associated with the above-described method of preloading bearings sometimes occurs where very high rotational speeds are involved. In these cases, machining the keyway in the shaft for the internal tab of the lockwasher can cause the shaft to become unbalanced thereby increasing the level of vibration in the shaft. Another difficulty sometimes encountered occurs when there is insufficient material in the shaft, such as when the shaft contains a bore, to accommodate the keyway for the internal tab of the bearing lockwasher.

Another method used to preload at least two bearings is to incorporate spring washers, such as wavy or belleville-type washers. The washer(s) is placed over the shaft and engages the inner race of a bearing, a nut is then threaded onto the shaft and tightened against the spring washer which in turn urges the inner races of the bearings together and maintains force against the nut to prevent the nut from loosening. A problem associated with this method of preloading bearings is that the sizes and stiffness of commercially available washers is limited. Therefore, a properly sized washer may be unavailable, or it may be necessary to utilize several spring washers stacked one-on-top-of-the-other to obtain the desired preload. This requires that additional space be provided in the bearing assembly to accommodate the additional washers.

Based on the foregoing, it is the general object of the present invention to provide a bearing assembly that overcomes the above-described drawbacks of prior art bearing assemblies.

It is a more specific object of the present invention to provide an assembly including preloaded bearings wherein bearing locknuts, lockwashers, or spring washers are not needed.

SUMMARY OF THE INVENTION

The present invention is directed to an assembly including preloaded bearings that includes a sleeve having an exterior surface defining and outer sleeve diameter, and an externally threaded section at an end of the sleeve. The sleeve also includes a bore defining an inner sleeve diameter extending at least part-way into the sleeve adjacent to the externally threaded section. At least two bearings, are provided, each having an inner bearing race, an outer bearing race, and a plurality of rolling elements positioned between and in rolling communication with the inner and outer bearing races. Bearings of this type include, but are not limited to angular contact and tapered roller bearings. The present invention also includes a bearing retainer defining an internally threaded section engaged with the external threads of sleeve for urging the inner bearing race of one of the bearings toward the inner bearing race of the other of the bearings, thereby inducing a predetermined amount of preload in the bearings. The above-described inner and outer diameters cooperate to define a cylindrical sleeve thickness that allows the sleeve to stretch in response to the bearing retainer being tightened against the inner race of one of the bearings. As the sleeve stretches, the external threads on the sleeve are urged against the internal threads on the bearing retainer releasably locking the retainer onto the sleeve and preventing the retainer from loosening during the operation of a machine in which the assembly is installed.

In a preferred embodiment of the present invention, a housing defining a bore adapted to receive the sleeve with the bearings mounted thereon can also be provided. The outer races of the bearings slidably communicate with an interior surface defined by the bore to support the sleeve for rotation relative to the housing. An outer bearing race retainer is adjustably coupled to the interior bore surface approximately concentric with the inner bearing race retainer for urging the outer bearing races of the bearings toward each other, further preloading the bearings.

In addition, a first bearing spacer positioned between the inner races of the at least two bearings, and a second bearing spacer positioned between the outer races of the bearings may also be provided. Since even a minute disparity in the thickness of one bearing spacer relative to the other can translate into large differences in preload, the first and second bearing spacers are preferably ground together as a matched pair.

BRIEF DESCRIPTION OF THE DRAWINGS

These and other features, aspects, and advantages of the present invention will become better understood with regard to the following description, appended claims, and accompanying drawing where:

DETAILED DESCRIPTION OF THE PREFERRED EMBODIMENT

Figure 1:
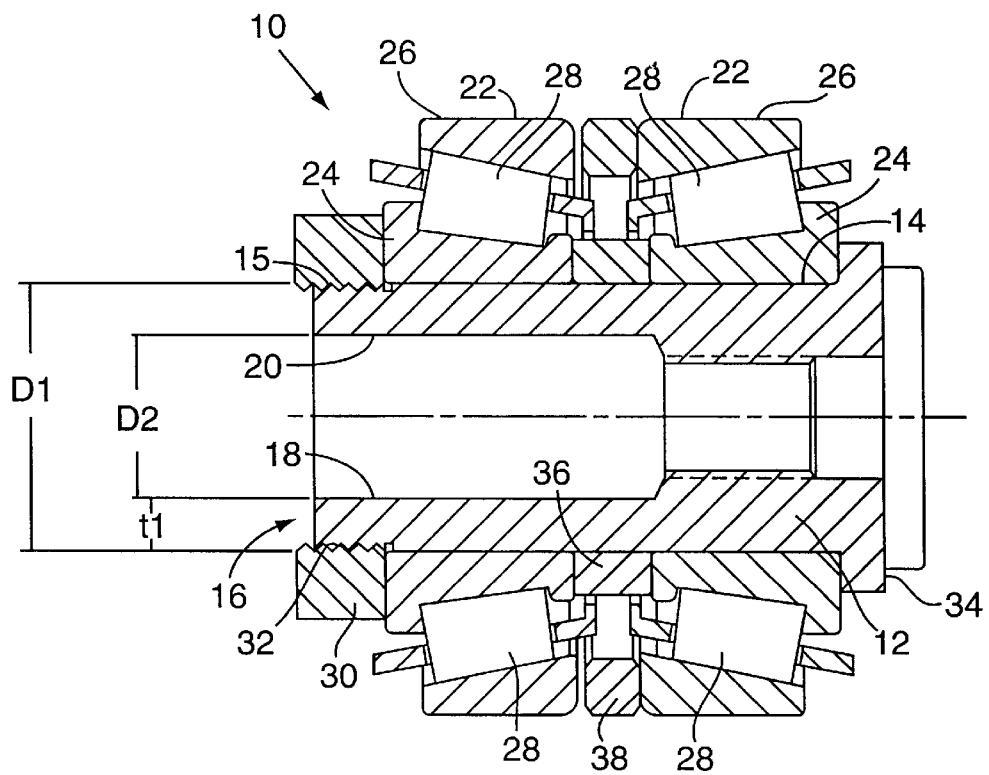
FIG. 1 is a cross-sectional side elevational view of the assembly for preloading bearings of the present invention.

Referring to FIG. 1, the assembly for preloading bearings of the present invention generally indicated by the reference numeral 10 includes a sleeve 12 having an exterior surface 14 defining an outer sleeve diameter D1. The sleeve 12 also has an externally threaded section 15 located at one end 16 of the sleeve and a bore 18 extending at least part-way into the sleeve adjacent to the externally threaded section and including an interior bore surface 20 defining an internal sleeve diameter D2.

The bearing assembly 10 also includes at least two bearings 22, depicted as tapered roller bearings in the illustrated embodiment, each including an inner bearing race 24, an outer bearing race 26, and a plurality of rolling elements 28 positioned between and in rolling communication with the inner and outer bearing races. While tapered roller bearings are shown in the illustrated embodiment, the present invention is not limited in this regard as other types of bearings, such as ball or angular contact bearings, can be substituted without departing from the broader aspects of the present invention.

A bearing retainer 30 is also provided by the present invention and includes an internally threaded section 32 engaged with the externally threaded section 16 on the sleeve 12. As the bearing retainer 30 is threaded onto the sleeve 12, it contacts the inner race 24 of one of said bearings 22 urging it toward the inner bearing race of the other of said bearings, thereby inducing a predetermined amount of preload in said bearings. In addition, the outer and inner diameters, D1 and D2 respectively, cooperate to define a cylindrical shell thickness t1, sized such that as the bearing retainer 30 is tightened against the inner bearing race 24 of one of said bearings 22, the sleeve 12 stretches urging the external threads 15 against the internal threads 32 of the bearing retainer. This in turn releasably locks the bearing retainer 30 on the sleeve 12, preventing the bearing retainer from loosening during operation of a machine in which the bearing assembly 10 is installed.

Still referring to FIG. 1, the sleeve 12 also includes a shoulder portion 34 opposite the externally threaded section 15. As the bearing retainer 30 is tightened against one of the inner races 34 of the bearings 22, the inner race of the other bearing abuts the shoulder 34 preventing the bearing from sliding on the exterior surface 14 of the sleeve 12, facilitating the preloading of the bearings.

The present invention can also include a first bearing spacer 36 positioned between the inner races 24 of the at least two bearings 22, and a second bearing spacer 38 positioned between the outer bearing races 26 of the bearings. Because small differences in the thickness of the first and second spacers, 36 and 38 respectively, can translate into large changes in the preload of the bearings, the first and second spacers are preferably ground together as a matched pair.

Figure 2:
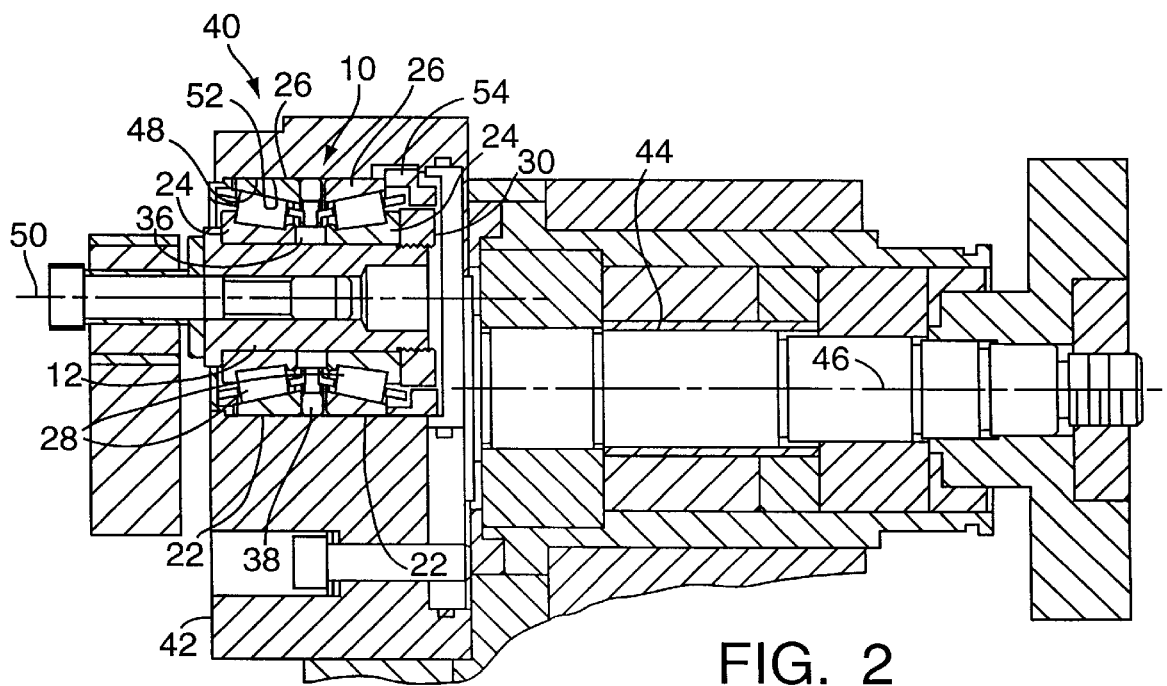
FIG. 2 is a cross-sectional side elevational view of a knife reciprocating mechanism having an assembly including preloaded bearings of the present invention.

Turning to FIG. 2, the assembly of the present invention is shown as part of a knife reciprocating mechanism 40, such as is used in a cutter head for cutting cloth and other sheet materials, and includes a housing or primary member 42, shown as a flywheel or crank member, supported on a drive shaft 44 for rotation about a first axis 46. A bore 48 having a second axis 50 parallel to and radially offset from the first axis 46 is defined by the primary member 42. The outer bearing races 26 of the bearings 22 are in sliding communication with an interior surface 52 defined by the bore 18, such that the sleeve 12 can rotate relative to the primary member. An outer bearing race retainer 54 is adjustably coupled to the interior surface 52 and is approximately concentric with the bearing retainer 30, for urging the outer race 26 of one of the bearings 22 toward the outer race of the other bearing, further preloading the bearings. While the assembly for preloading bearings 10, has been described as being part of a knife reciprocating mechanism, the present invention is not limited in this regard as the bearing assembly of the present invention can be incorporated into many other types of rotating machines, such as machine tools, without departing from the broader aspects of the invention.

Referring back to FIG. 1, the bearings 22 are preloaded by tightening the bearing retainer 30 against the inner bearing race 24 of one the bearings, urging it toward the inner bearing race of the other bearing. While the inner bearing races 24 are being urged toward one another, the sleeve 12 is stretching by a predetermined amount in accordance with the cylindrical sleeve thickness t1 as defined by the aforementioned outer and inner diameters, D1 and D2 respectively. This in turn urges the external threads 15 of the sleeve 12 against the internal threads 32 of the bearing retainer 30, thereby releasably locking the bearing retainer on the sleeve and preventing it from loosening during operation of the machine in which the bearing assembly is installed.

While preferred embodiments have been shown and described, various modifications and substitutions may be made without departing from the spirit and scope of the invention. Accordingly, it is to be understood that the present invention has been described by way of example, and not by limitation.

What is claimed is:

1. An assembly including preloaded bearings, comprising:

a sleeve having, an exterior surface defining an outer sleeve diameter, an externally threaded section located at one end of said sleeve, and a bore defining an inner sleeve diameter, said bore extending at least part-way into said sleeve adjacent to said externally threaded section;

at least two bearings, each including, an inner bearing race slidably mounted on said exterior surface, an outer bearing race, and a plurality of rolling elements positioned between and in rolling communication with said inner and outer bearing races;

a bearing retainer having an internally threaded section engaged with said external threads of said sleeve, for urging the inner bearing race of one of said bearings toward the inner bearing race of the other of said bearings, thereby inducing a predetermined amount of preload in said bearings; and wherein said inner and outer diameters cooperate to define a cylindrical sleeve thickness that allows said sleeve to stretch relative to said bearing retained in response to said bearing retainer being tightened against the inner race of one of said bearings, thereby urging said external threads against said internal threads and releasably locking said retainer onto said sleeve.

2. An assembly including preloaded bearings as defined by claim 1, wherein:

said sleeve defines a shoulder positioned at an end of said sleeve opposite to said externally threaded section and extending outwardly from said exterior surface; and said inner bearing race of the other of said bearings abuts said shoulder.

3. An assembly including preloaded bearings as defined by claim 1, further comprising:

a first bearing spacer positioned between said inner bearing races of said at least two bearings; and a second bearing spacer positioned between said outer bearing races of said at least two bearings.

4. An assembly including preloaded bearings as defined by claim 3, wherein:

said first and second bearing spacers are a matched pair having the same thickness.

5. An assembly including preloaded bearings as defined by claim 1, further comprising:

a primary member supported for rotation about a first axis and defining a bore having an interior surface and a second axis approximately parallel to, and radially offset from said first axis;

said sleeve being positioned in said bore with said outer bearing races in sliding communication with said interior surface, thereby supporting said sleeve for rotation relative to said primary member.

6. An assembly including preloaded bearings as defined by claim 5, further comprising:

an outer bearing race retainer adjustably coupled to said interior surface for urging the outer race of one of said bearings toward the outer race of the other of said bearings, thereby further preloading said bearings.

7. An assembly including preloaded bearings as defined by claim 1, further comprising:

a housing defining a bore adapted to slidable receive said at least two bearings and to support said sleeve for rotation relative to said housing.

8. An assembly including preloaded bearings as defined by claim 7, further comprising:

said bore defining an interior surface; and an outer bearing spacer adjustably coupled to said interior surface for urging the outer bearing race of one of said bearings toward the outer race of the other of said bearings, thereby further preloading said at least two bearings.

* * * * *

UNITED STATES PATENT AND TRADEMARK OFFICE
CERTIFICATE OF CORRECTION

PATENT NO. : 5,860,750
DATED : 1/19/99
INVENTOR(S) : Kuchta et al.

It is certified that error appears in the above-identified patent and that said Letters Patent is hereby corrected as shown below:

Column 4, line 8, delete "18" and insert --48--.

Signed and Sealed this

Twenty-seventh Day of April, 1999

Attest:

Q. TODD DICKINSON

*Attesting Officer*     *Acting Commissioner of Patents and Trademarks*